US011973878B2

(12) United States Patent
Young (10) Patent No.: US 11,973,878 B2
(45) Date of Patent: *Apr. 30, 2024

(54) NON-FUNGIBLE TOKEN CUSTODY CHAIN FOR MULTI-COMPONENT HARDWARE DEVICES

(71) Applicant: BANK OF AMERICA CORPORATION, Charlotte, NC (US)

(72) Inventor: Michael Robert Young, Davidson, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 264 days.

This patent is subject to a terminal disclaimer.

(21) Appl. No.: 17/540,825

(22) Filed: Dec. 2, 2021

(65) Prior Publication Data

US 2023/0179422 A1    Jun. 8, 2023

(51) Int. Cl.
*H04L 29/06*    (2006.01)
*G06F 16/27*    (2019.01)
*H04L 9/32*    (2006.01)
*H04L 9/40*    (2022.01)
*H04L 9/00*    (2022.01)

(52) U.S. Cl.
CPC ............ *H04L 9/3236* (2013.01); *G06F 16/27* (2019.01); *H04L 63/0876* (2013.01); *H04L 9/50* (2022.05)

(58) Field of Classification Search
CPC ...... H04L 9/50; H04L 9/3236; H04L 63/0876
See application file for complete search history.

(56) References Cited

U.S. PATENT DOCUMENTS

| 7,577,941 | B2 | 8/2009 | Gallagher et al. |
| 7,747,995 | B2 | 6/2010 | Fritsch et al. |
| 8,140,911 | B2 | 3/2012 | Borghetti et al. |
| 9,953,143 | B2 | 4/2018 | Yee et al. |
| 10,691,808 | B2 | 6/2020 | Brucker et al. |
| 10,706,156 | B2 | 7/2020 | Bhalla et al. |
| 2018/0167198 | A1* | 6/2018 | Muller ................... G06F 21/44 |
| 2021/0243201 | A1* | 8/2021 | Tandel .................. H04L 9/0897 |
| 2021/0248653 | A1* | 8/2021 | McKenzie ............ H04L 9/3247 |
| 2022/0374888 | A1* | 11/2022 | Lackey .............. G06Q 20/3827 |
| 2023/0179422 | A1* | 6/2023 | Young ................... H04L 9/3236 726/5 |

* cited by examiner

*Primary Examiner* — Dao Q Ho
(74) *Attorney, Agent, or Firm* — Moore & Van Allen PLLC; James C. Edwards (57) ABSTRACT

A comprehensive system for chain-of-custody for hardware devices and their components. Specifically, as the components, assemblies and the hardware device are manufactured and/or assembled, non-fungible tokens (NFTs) are generated for each component, assembly and the overall hardware device that indicate that the component, assembly or hardware device is in a certified/verified good state (i.e., have not been tampered with). The NFTs are generated using measured authenticity characteristics (e.g., electro-magnetic, heat, weight, dimensions and the like) of a corresponding component, assembly or hardware device as at least a portion of the input to the hash algorithm. The NFTs are subsequently communicated to a distributed trust computing network at which the nodes converge to verify an authenticity and certifiable state of the NFT, and blocks of data are generated within distributed ledgers that store the verified NFT.

11 Claims, 6 Drawing Sheets

NON-FUNGIBLE TOKEN CUSTODY CHAIN FOR MULTI-COMPONENT HARDWARE DEVICES

FIELD OF THE INVENTION

The present invention is generally related to verifying the authenticity and providing chain-of-custody of hardware down to the component level and, more specifically, generate non-fungible tokens (NFT) for components and hardware devices containing the components at various manufacturing stages based on measured authenticity characteristics that verify that the component or device is in a certifiable (i.e., known good) state.

BACKGROUND

Hardware devices undergo various stages of existence during the manufacturing process. For example, computing devices (e.g., PCs, network support devices, mobile communication devices and the like) undergo a chain of events during manufacturing starting with semiconductor fabrication, leading to integrated circuit manufacturing, circuit board assembly, and ultimately device assembly.

Recently there have been real-world instances where malicious actors have tampered with integrated circuits and/or processing devices to carry out nefarious actions. Unlike software, when something is wrongfully embedded into an integrated circuit or a processor it is difficult for the end user to detect.

Therefore, a need exists to develop systems, methods, computer program products and the like that provide a chain-of-custody for hardware devices and the components that make up the hardware devices. In this regard, a need exists for the end-user to know that when they receive the hardware device it is in a certified/verified good state (i.e., a so-called "golden state"). For this to occur, each manufacturer in the chain-of-custody must also know that when they receive components to be assembled into the hardware device or parts that make up the hardware device those components are in a certified/verified good state. Additionally, by creating a chain-of-custody for hardware device and their components ancillary benefits may be realized in the form of being able to track hardware devices and their components, which may benefit inventory control at the hardware device and component levels.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing a comprehensive system for chain-of-custody for hardware devices and their components. Specifically, according to embodiments of the invention, as components of the hardware device are manufactured, a non-fungible token (NFT) is generated for each component that indicates that the component is in a certified/verified good state (i.e., the component is the state it should be and has not been otherwise tampered with). The NFTs are generated using measured authenticity characteristics (e.g., electro-magnetic, heat, weight, dimensions and the like) of a corresponding component as at least a portion of the input to the hash algorithm. The NFTs are subsequently communicated to a distributed trust computing network at which the nodes converge to verify an authenticity and certifiable state of the NFT, and data blocks are generated within distributed ledgers that store the verified NFT. In this regard, the NFT is associated with the component, and time and place of manufacture of the component.

The component is subsequently assembled into the hardware device or a sub-assembly of the hardware device. The NFT proves to the assembler of the hardware device or the sub-assembly that the components they are using are authentic (i.e., in a certified/verified good state). Once the hardware device or sub-assembly has been manufactured/assembled, another NFT is generated that indicates that the hardware device or sub-assembly is in a certified/verified good state. The NFT is generated using measured authenticity characteristics (e.g., electro-magnetic, heat, weight, dimensions and the like) of the hardware device or sub-assembly as at least a portion of the input to the hash algorithm. The NFT is subsequently communicated to a distributed trust computing network at which the nodes converge to verify an authenticity and certifiable state of the NFT, and data blocks are generated within distributed ledgers that store the verified NFT.

Once the hardware device has been fully assembled, the hardware device NFT and the NFTs of all the sub-assemblies and components are containerized under a principal NFT that serves to link all of the NFTs together for purposes of creating the chain-of-custody. Subsequently, when the hardware device is shipped to an end-user, the end-user is provided access to the principal NFT and, thus access to all of the NFTs at the component, sub-assemble and hardware device level. The NFTs not only prove that the end user is receiving a hardware device in which the hardware device and its assemblies/components are in certified/verified known good states but also proves that the end user is the rightful owner/possessor of the hardware device and its assemblies/components.

During the usage/lifecycle period of the hardware device, in the event that assemblies/components are added, deleted or replaced an updated NFT may be generated for the hardware device and/or an updated principal NFT may be generated. In this regard, the authenticity characteristics are re-measured for the altered hardware device and the updated NFT is generated using the re-measured authenticity characteristics as at least a portion of the input to has algorithm.

A system for hardware authenticity and traceability defines first embodiments of the invention. The system includes a distributed trust computing network comprising a plurality of decentralized nodes, each decentralized node having a first memory and at least one first processing device in communication with the first memory. The first memory of the decentralized nodes is configured to store one or more distributed ledgers. Each distributed ledger includes a plurality of blocks of data. The system additionally includes a first computing platform including a second memory and at least one second processing device in communication with the second memory. The second memory stores a hardware authenticity and traceability sub-system that includes first instructions that are executable by the at least one processing device. The first instructions are configured to, in response to manufacturing each of a plurality of components for a hardware device and measuring authenticity characteristics for each of the plurality of components, generate, for each of the plurality of components, a component-based non-fungible token (NFT) associated with a corresponding component using at least one component identifier and the measured authenticity characteristics of the corresponding component as an input to a hash algorithm. The instructions are further configured communicate the component-based NFTs to the distributed trust computing network. In response to the distributed trust computing network receiving the component-based NFTs, the decentralized nodes of the distributed trust computing network are configured to (i) reach a consensus on each of the component-based NFTs to verify an authenticity and certifiable state of the corresponding component, and (ii) generate blocks of data within at least one of the one or more distributed ledgers, each of the blocks of data storing one of the verified component-based NFTs.

In specific embodiments of the system, the first instructions are further configured to in response to manufacturing the hardware device including the plurality of components and measuring authenticity characteristics of the hardware device, generate a hardware device-based NFT associated with the hardware device using at least one hardware device identifier and the measured authenticity characteristics of the hardware device as an input to a hash algorithm. The instructions are further configured to communicate the hardware device-based NFT to the distributed trust computing network. In response to the distributed trust computing network receiving the hardware device-based NFT, the decentralized nodes of the distributed trust computing network are configured to (i) reach a consensus on the hardware device-based NFT to verify an authenticity and certifiable state of the hardware device, and (ii) generate a block of data within at least one of the one or more distributed ledgers that stores the verified hardware device-based NFT.

In other specific embodiments of the system, the first instructions are configured to generate a principal hardware device NFT using at least one hardware device identifier and the least one component identifier for each of the plurality of components as an input to the hash algorithm and link the hardware device-based NFT to each of the component-based NFTs. The first instructions are further configured to communicate the principal hardware device NFT to the distributed trust computing network. In response to the distributed trust computing network receiving the principal hardware device NFT, the decentralized nodes of the distributed trust computing network are configured to (i) reach a consensus on the principal hardware device NFT to verify an authenticity and certifiable state of the hardware device and the plurality of components, and (ii) generate a block of data within at least one of the one or more distributed ledgers that stores the verified principal hardware device NFT.

In still further specific embodiments of the system, the first instructions are configured to, in response to updating, during use, the hardware device by adding or deleting a component to the hardware device and re-measuring authenticity characteristics of the hardware device, generate an updated hardware device-based NFT associated with the hardware device using at least one hardware device identifier and the re-measured authenticity characteristics of the hardware device as an input to a hash algorithm. The first instructions are further configured to communicate the updated hardware device-based NFT to the distributed trust computing network. In response to the distributed trust computing network receiving the updated hardware device-based NFT, the decentralized nodes of the distributed trust computing network are configured to (i) reach a consensus on the updated hardware device-based NFT to verify an authenticity and certifiable state of the updated hardware device, and (ii) generate a block of data within at least one of the one or more distributed ledgers that stores the verified updated hardware device-based NFT. In additional related specific embodiments of the system, the first instructions are further configured to generate an updated principal hardware device NFT using at least one hardware device identifier and the least one component identifier for each of the plurality of components as an input to the hash algorithm and link the updated hardware device-based NFT to each of the component-based NFTs and communicate the updated principal hardware device NFT to the distributed trust computing network. In response to the distributed trust computing network receiving the updated principal hardware device NFT, the decentralized nodes of the distributed trust computing network are configured to (i) reach a consensus on the updated principal hardware device to verify an authenticity and certifiable state of the updated hardware device and the plurality of components, and (ii) generate a block of data within at least one of the one or more distributed ledgers that stores the verified updated principal hardware device NFT.

In further specific embodiments of the system, the first instructions configure to generate, for each of the plurality of components, the component-based NFT associated with a corresponding component are further configured to generate the component-based NFTs further using (i) a date and a time of manufacturing the corresponding component and (ii) a physical manufacturing location as the inputs to the hash algorithm.

In further specific embodiments, the system includes a second computing platform including a third memory and at least one third processing device in communication with the third memory. The third memory stores an end-user hardware traceability and verification sub-system that includes second instructions that are executable by the at least one third processing device. The second instructions are configured to in conjunction with receiving the hardware device, receive access rights to the principal hardware device NFT, and access at least one of the principal hardware device NFT, the hardware device-based NFT and one or more of the component-based NFTs stored on one or distributed ledgers of the distributed trust computing network to verify traceability and authenticity of at least one of the hardware device and one or more of the plurality of components of the hardware device. In related embodiments of the system, the second instructions are further configured to, in response to periodically re-measuring one or more of the authenticity characteristics of the hardware device, access at least one of the principal hardware device NFT, and the hardware device-based NFT stored on one or distributed ledgers of the distributed trust computing network to verify authenticity of the hardware device by comparing the measured authenticity characteristic used as inputs for generating the hardware-based NFT to the re-measured authenticity characteristics of the hardware device.

In further specific embodiments of the system, the measured authenticity characteristics of the component and/or hardware device include one or more of (i) electro-magnetic characteristics, (ii) heat characteristics (iii) weight of the component, and (iv) physical dimensions of the component.

A computer-implemented method for software authenticity and traceability defines second embodiments of the invention. Th computer-implemented method is executed by one or more processing devices. The computer-implemented method includes, in response to manufacturing each of a plurality of components for a hardware device and measuring authenticity characteristics for each of the plurality of components, generating, for each of the plurality of components, a component-based non-fungible token (NFT) associated with a corresponding component using (i) at least one component identifier and (ii) the measured authenticity characteristics of the corresponding component as an input to a hash algorithm. The method further includes communicating the component-based NFTs to a distributed trust computing network. The distributed trust computing network including a plurality of decentralized nodes, each decentralized node having a first memory and at least one first processor in communication with the memory. The first memory of the decentralized nodes is configured to store a distributed ledger that includes a plurality of blocks of data. Additionally, the computer-implemented method includes, in response to the distributed trust computing network receiving the component-based NFTs, verifying an authenticity and certifiable state of the corresponding component-based NFT through consensus reached by the decentralized nodes of the distributed trust computing network and, in response to verifying the authenticity and certifiable state of the corresponding component-based NFT, generating blocks of data within at least one of the one or more distributed ledgers. Each of the blocks of data storing one of the verified component-based NFTs.

In specific embodiments of the computer-implemented method, in response to manufacturing the hardware device including the plurality of components and measuring authenticity characteristics of the hardware device, generating a hardware device-based NFT associated with the hardware device using at least one hardware device identifier and the measured authenticity characteristics of the hardware device as an input to a hash algorithm. In addition, the method includes communicating the hardware device-based NFT to the distributed trust computing network. Further, the method includes, in response to the distributed trust computing network receiving the hardware device-based NFT, verifying the authenticity and certifiable state of the hardware device-based NFT through consensus reached by the decentralized nodes of the distributed trust computing network. Additionally, the method includes, in response to verifying the authenticity and certifiable state of the hardware device-based NFT, generating a block of data within at least one of the one or more distributed ledgers that stores the verified hardware device-based NFT.

In other specific embodiments of the computer-implemented method, the method includes generating a principal hardware device NFT using at least one hardware device identifier and the least one component identifier for each of the plurality of components as an input to the hash algorithm. The principal hardware device NFT links the hardware device-based NFT to each of the component-based NFTs. In addition, the method includes communicating the principal hardware device NFT to the distributed trust computing network. Further, the method includes, in response to the distributed trust computing network receiving the principal hardware device NFT, verifying the authenticity and certifiable state of the principal hardware device NFT through consensus reached by the decentralized nodes of the distributed trust computing network. Additionally, the method includes, in response to verifying the authenticity and certifiable state of the principal hardware device NFT, generating a block of data within at least one of the one or more distributed ledgers that stores the verified principal hardware device NFT.

In additional specific embodiments, the computer-implemented method includes, in response to updating, during use, the hardware device by adding or deleting a component to the hardware device and re-measuring authenticity characteristics of the hardware device, generating an updated hardware device-based NFT associated with the hardware device using at least one hardware device identifier and the re-measured authenticity characteristics of the hardware device as an input to a hash algorithm. In addition, the method includes communicating the updated hardware device-based NFT to the distributed trust computing network. In addition, the method includes, in response to the distributed trust computing network receiving the updated hardware device-based NFT, verifying the authenticity and certifiable state of the updated hardware device-based NFT through consensus reached by the decentralized nodes of the distributed trust computing network. Further, the method includes, in response to verifying the authenticity and certifiable state of the updated hardware device-based NFT, generating a block of data within at least one of the one or more distributed ledgers that stores the verified updated hardware device-based NFT.

In specific embodiments of the computer-implemented method, generating, for each of the plurality of components, the NFT associated with a corresponding component further comprises generating the component-based NFTs further using (i) a date and time of manufacturing the corresponding component and (ii) a physical manufacturing location as the inputs to the hash algorithm.

In still further specific embodiments, the computer-implemented method includes, in conjunction with receiving the hardware device, receiving access rights to the principal hardware device NFT, and accessing at least one of the principal hardware device NFT, the hardware device-based NFT and one or more of the component-based NFTs stored on one or distributed ledgers of the distributed trust computing network to verify traceability and authenticity of at least one of the hardware device and one or more of the plurality of components of the hardware device.

A computer program product including a non-transitory computer-readable medium defines third embodiments of the invention. The non-transitory computer-readable medium includes a first set of codes for causing a computer to, in response to manufacturing each of a plurality of components for a hardware device and measuring authenticity characteristics for each of the plurality of components, generate, for each of the plurality of components, a component-based non-fungible token (NFT) associated with a corresponding component using at least one component identifier and the measured authenticity characteristics of the corresponding component as an input to a hash algorithm. In addition, the computer-readable medium includes a second set of codes for causing a computer to communicate the component-based NFTs to a distributed trust computing network comprising a plurality of decentralized nodes, each decentralized node having a first memory and at least one first processor in communication with the memory. The first memory of the decentralized nodes is configured to store a distributed ledger comprising a plurality of blocks of data. Additionally, the computer-readable medium includes a third set of codes for causing a computer to, in response to the distributed trust computing network receiving the component-based NFTs, verify an authenticity and certifiable state of the corresponding component-based NFT through consensus reached by the decentralized nodes of the distributed trust computing network. Moreover, the computer-readable medium includes a fourth set of codes for causing a computer to, in response to verifying the authenticity and certifiable state of the corresponding component-based NFT, generate blocks of data within at least one of the one or more distributed ledgers, each of the blocks of data storing one of the verified component-based NFTs.

In specific embodiments of the computer program product, the computer-readable medium further includes a fifth set of codes for causing a computer to, in response to manufacturing the hardware device including the plurality of components and measuring authenticity characteristics of the hardware device, generate a hardware device-based NFT associated with the hardware device using at least one hardware device identifier and the measured authenticity characteristics of the hardware device as an input to a hash algorithm. In addition, the computer-readable medium includes a sixth set of codes for causing a computer to communicate the hardware device-based NFT to the distributed trust computing network. Further, the computer-readable medium includes a seventh set of codes for causing a computer to, in response to the distributed trust computing network receiving the hardware device-based NFT, verify the authenticity and certifiable state of the hardware device-based NFT through consensus reached by the decentralized nodes of the distributed trust computing network. Additionally, the computer-readable medium includes an eighth set of codes for causing a computer to, in response to verifying the authenticity and certifiable state of the hardware device-based NFT, generate a block of data within at least one of the one or more distributed ledgers that stores the verified hardware device-based NFT.

In further specific embodiments of the computer program product, the computer-readable medium further includes a ninth set of codes for causing a computer to generate a principal hardware device NFT using at least one hardware device identifier and the least one component identifier for each of the plurality of components as an input to the hash algorithm. The principal hardware device NFT links the hardware device-based NFT to each of the component-based NFTs. Additionally, the computer-readable medium includes a tenth set of codes for causing a computer to communicate the principal hardware device NFT to the distributed trust computing network. Further, the computer-readable medium includes an eleventh set of codes for causing a computer to, in response to the distributed trust computing network receiving the principal hardware device NFT, verify the authenticity and certifiable state of the principal hardware device NFT through consensus reached by the decentralized nodes of the distributed trust computing network. Moreover, the computer-readable medium includes a twelfth set of codes for causing a computer to, in response to verifying the authenticity and certifiable state of the principal hardware device NFT, generating a block of data within at least one of the one or more distributed ledgers that stores the verified principal hardware device NFT.

In still further specific embodiments of the computer program product, the computer-readable medium further includes a thirteenth set of codes for causing a computer to, in response to updating, during use, the hardware device by adding or deleting a component to the hardware device and re-measuring authenticity characteristics of the hardware device, generate an updated hardware device-based NFT associated with the hardware device using at least one hardware device identifier and the re-measured authenticity characteristics of the hardware device as an input to a hash algorithm. In addition, the computer-readable medium includes a fourteenth set of codes for causing a computer to communicate the updated hardware device-based NFT to the distributed trust computing network. Further, the computer-readable medium includes a fifteenth set of codes for causing a computer to, in response to the distributed trust computing network receiving the updated hardware device-based NFT, verify the authenticity and certifiable state of the updated hardware device-based NFT through consensus reached by the decentralized nodes of the distributed trust computing network. Moreover, the computer-readable medium includes a sixteenth set of codes for causing a computer to, in response to verifying the authenticity and certifiable state of the updated hardware device-based NFT, generating a block of data within at least one of the one or more distributed ledgers that stores the verified updated hardware device-based NFT.

Moreover, in additional specific embodiments of the computer program product, the first set of codes are further configured to cause the computer to generate the generating the component-based NFTs further using (i) a date and time of manufacturing the corresponding component and (ii) a physical manufacturing location as the inputs to the hash algorithm.

Thus, according to embodiments of the invention, which will be discussed in greater detail below, the present invention addresses needs and/or achieves other advantages by providing a comprehensive system for chain-of-custody for hardware devices and their components. Specifically, according to embodiments of the invention, as the components, assemblies and the hardware device are manufactured, non-fungible tokens (NFTs) are generated for each component, assembly and the overall hardware device that indicate that the component, assembly or hardware device is in a certified/verified good state (i.e., the component, assembly and hardware device are in the state they should be and have not been otherwise tampered with). The NFTs are generated using measured authenticity characteristics (e.g., electro-magnetic, heat, weight, dimensions and the like) of a corresponding component, assembly or hardware device as at least a portion of the input to the hash algorithm. The NFTs are subsequently communicated to a distributed trust computing network at which the nodes converge to verify an authenticity and certifiable state of the NFT, and data blocks are generated within distributed ledgers that store the verified NFT.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, generate mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide a comprehensive system for chain-of-custody for hardware devices and their components. Specifically, according to embodiments of the invention, as components of the hardware device are manufactured, a non-fungible token (NFT) is generated for each component that indicates that the component is in a certified/verified good state (i.e., the component is the state it should be and has not been otherwise tampered with). The NFTs are generated using measured authenticity characteristics (e.g., electro-magnetic, heat, weight, dimensions and the like) of a corresponding component as at least a portion of the input to the hash algorithm. The NFTs are subsequently communicated to a distributed trust computing network at which the nodes converge to verify an authenticity and certifiable state of the NFT, and data blocks are generated within distributed ledgers that store the verified NFT. In this regard, the NFT is associated with the component, and time and place of manufacture of the component.

The component is subsequently assembled into the hardware device or a sub-assembly of the hardware device. The NFT proves to the assembler of the hardware device or the sub-assembly that the components they are using are authentic (i.e., in a certified/verified good state). Once the hardware device or sub-assembly has been manufactured/assembled, another NFT is generated that indicates that the hardware device or sub-assembly is in a certified/verified good state. The NFT is generated using measured authenticity characteristics (e.g., electro-magnetic, heat, weight, dimensions and the like) of the hardware device or sub-assembly as at least a portion of the input to the hash algorithm. Similar to the NFTs generated for the components, the hardware device or sub-assembly or NFT is subsequently communicated to a distributed trust computing network at which the nodes converge to verify an authenticity and certifiable state of the NFT, and data blocks are generated within distributed ledgers that store the verified NFT.

Once the hardware device has been fully assembled, the hardware device NFT and the NFTs of all the sub-assemblies and components are containerized under a principal NFT that serves to link all of the NFTs together for purposes of creating the chain-of-custody. Subsequently, when the hardware device is shipped to an end-user, the end-user is provided access to the principal NFT and, thus access to all of the NFTs at the component, sub-assemble and hardware device level. The NFTs not only prove that the end user is receiving a hardware device in which the hardware device and its assemblies/components are in certified/verified known good states but also proves that the end user is the rightful owner/possessor of the hardware device and its assemblies/components.

During the usage/lifecycle period of the hardware device, in the event that assemblies/components are added, deleted or replaced an updated NFT may be generated for the hardware device and/an updated principal NFT may be generated. In this regard, the authenticity characteristics are re-measured for the altered hardware device and the updated NFT is generated using the re-measured authenticity characteristics as at least a portion of the input to has algorithm.

Figure 1:
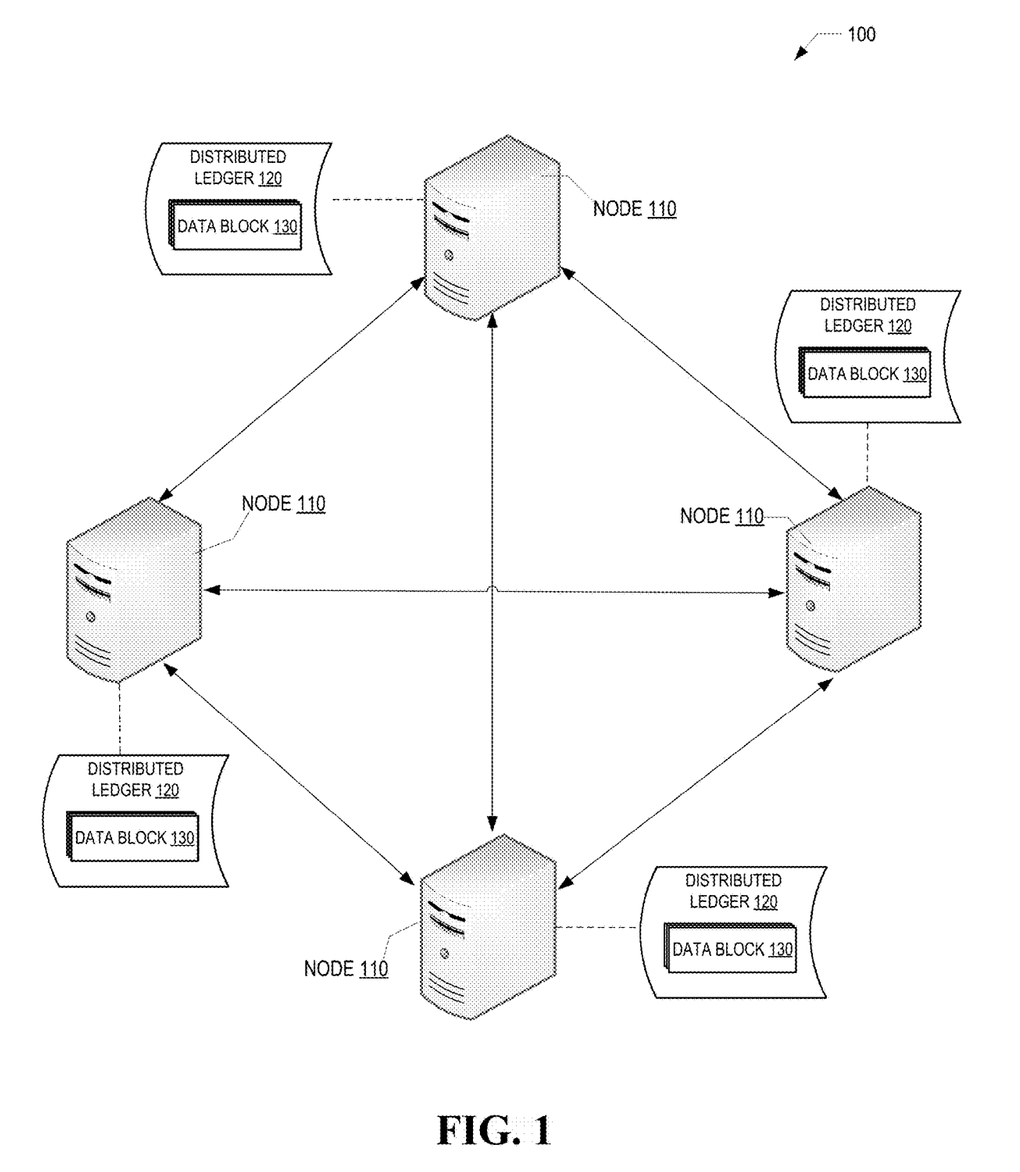
FIG. 1 is a schematic/block of a distributed trust computing network, in accordance with embodiments of the present invention.

Referring to FIG. 1 a schematic diagram of an exemplary distributed trust computing network 100 is depicted, in accordance with embodiments of the present invention. The distributed trust computing network 100, in other instances referred to a blockchain network, is a distributed database that maintains, e.g., a list of data records, or the like. In specific embodiments of the invention the data records may include non-fungible tokens (NFTs) that serve to verify the authenticity and certifiable-state of hardware devices. The security of the data maintained within the trust network is enhanced by the distributed nature of the network. The distributed trust computing network 100 typically includes several decentralized nodes 110, which may be one or more systems, machines, computers, databases, data stores or the like operably connected with one another. In some instances, each of the nodes 110 or multiple nodes 110 are maintained by different entities. A distributed trust computing network 100 typically works without a central repository or single administrator.

A distributed trust computing network 100 provides numerous advantages over traditional storage networks/databases. A large number of the decentralized nodes 110 of a trust network may reach a consensus regarding the validity of resources or data maintained with a block of the distributed trust computing network, in the context of the present invention the validity of the hardware component and/or device (i.e., the validity of the measured authenticity characteristics).

The distributed trust computing network 100 typically has two primary types of records. The first type is the record type, which consists of the actual data, in this case an NFT, stored in a data block 130 within a distributed register/ledger 120. The second type is the block type, which are records that confirm when and in what sequence certain events became recorded as part of the distributed trust computing network. Records, such as a code change file segment records, and the events associated therewith are generated by participants using the distributed trust computing network in its normal course of business, for example, when code change file segment is determined, a data block(s) 130 is generated by users known as "miners" who use specialized software/equipment to generate data blocks 130. Holders of a data block 130 of the distributed trust computing network 100 agree to store the data block 130 within the distributed trust computing network 100 and the related data blocks 130 are passed around to various nodes 110 of the distributed trust computing network 100. A "valid" data block 130 or related event is one that can be validated based on a set of rules that are defined by the particular system implementing the distributed trust computing network 100. For example, in the case of hardware verification, a valid data block is one that stores an NFT which serves to verify the authenticity and certifiable state of the corresponding hardware component and/or device containing the hardware component.

A distributed trust computing network 100 is decentralized—meaning that a distributed register/ledger 120 (i.e., a decentralized register/ledger) is maintained on multiple nodes 110 of the distributed trust computing network 100. In this regard, one node 110 in the distributed trust computing network 100 may have a complete or partial copy of the distributed register/ledger 120 or set of records and/or blocks 130 on the distributed trust computing network 100. Transactions/events (i.e., newly presented NFTs) are initiated at a node 110 of a distributed trust computing network 100 and communicated to the various other nodes 110 of the distributed trust computing network 100 for validation purposes. Any of the nodes 110 can validate the content of a data block 130 or an associated event, add the data block 130 and/or the contents of the data block 130 to its copy of the distributed register/ledger 120, and/or broadcast the detail/data of the data block 130, its associated validation (in the form of a data block 130) and/or other data to other nodes 130.

Figure 2:
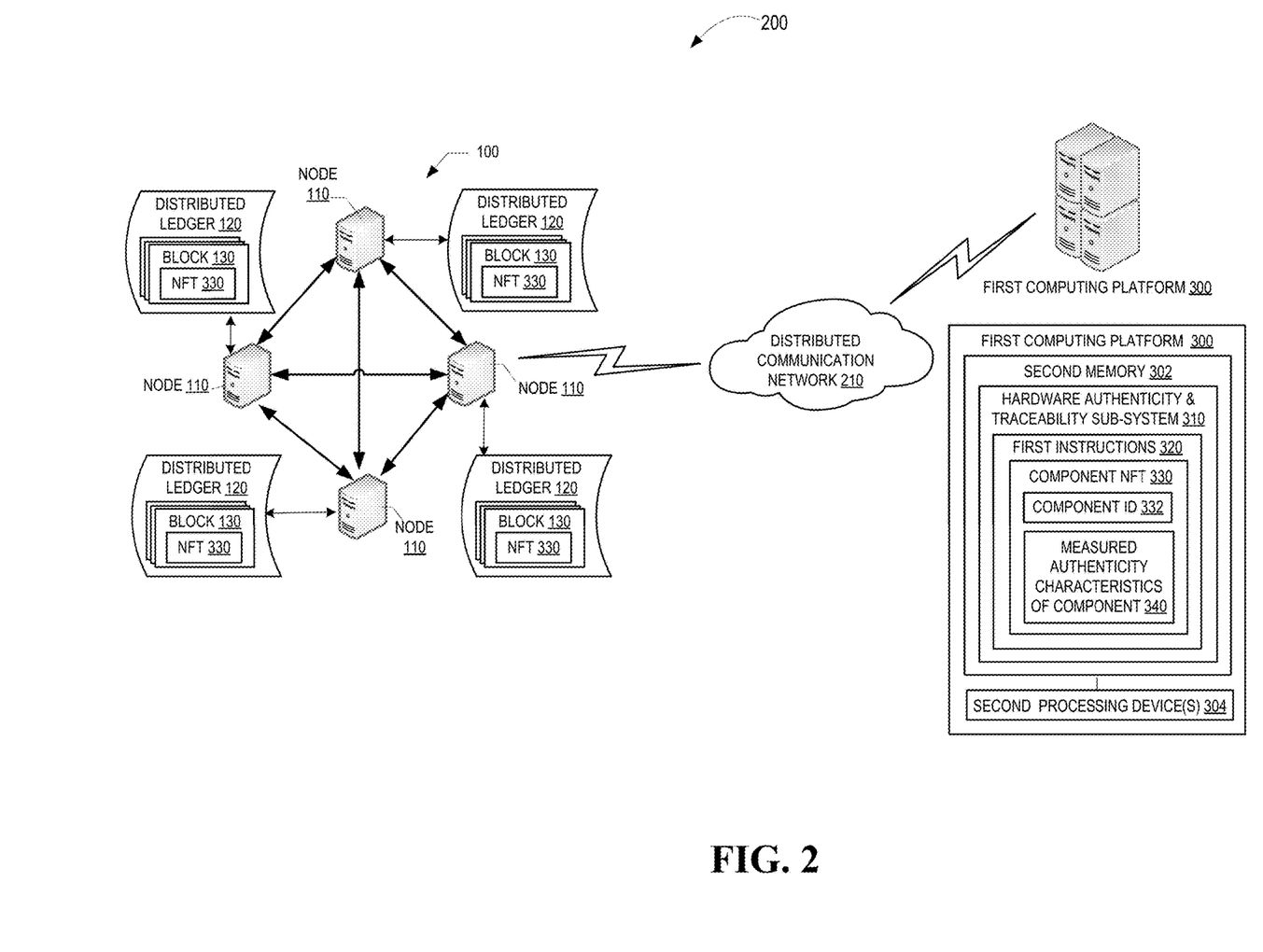
FIG. 2 is a schematic/block diagram of a hardware authenticity and traceability system, in accordance with embodiments of the present invention.

Referring to FIG. 2, a schematic/block diagram is presented of a system 100 for verifying the authenticity of hardware components and initiating the creation of a chain-of-custody for the hardware components and devices comprising the hardware components, in accordance with embodiments of the present invention. The system 100 is implemented within a distributed communication network 210 that may include the Internet, one or more intranets, one or more cellular networks, one or more short-range wireless networks or the like.

The system includes a distributed trust computing network 100 including a plurality of decentralized nodes 110. Each decentralized node 110 having a first memory (not shown in FIG. 2) and at least one first processing device (not shown in FIG. 2). The first memory of the decentralized nodes 110 is configured to store a distributed ledger 120 that includes a plurality of data blocks 130.

The system 100 additionally includes a first computing platform having a second memory 302 and at least one second processing device 304 in communication with first memory 302. Second memory 302 stores hardware authenticity and traceability sub-system 310 that includes first instructions 320, which are executable by at least one of the second processing devices 304. First instructions 320 are configured to, in response to manufacturing a hardware component and measuring authenticity characteristics of the hardware component, generate a component-based non-fungible token (NFT) 330. The component-based NFT 330 is generated using at least one component identifier 332 and the measured authenticity characteristics 340 of the component as the input to the hash algorithm.

In accordance with embodiments of the present invention, the authenticity characteristics include any characteristic of the hardware component that is measurable and is associated with component integrity (i.e., ensuring that the component is in a certifiable-state and has not otherwise been tampered with). Authenticity characteristics will vary depending on hardware component type. For example, an integrated circuit will have different authenticity characteristics than a memory unit, a resistor, a transistor, a capacitor or the like. In addition, measured authenticity characteristics are not required to the same for hardware components of a same component type (i.e., one integrated circuit may have a first set of measured authenticity characteristics, while another integrated circuit may have different second set of measured authenticity characteristics). In specific embodiments of the invention, the measurements may include, but are not limited to, electro-magnetic characteristics, heat attributes/characteristics, physical characteristics, such weight, dimensions and the like. To ensure the integrity of the component the authenticity characteristics should be measured as soon as possible after the component has manufactured and conducted in a controlled environment.

Once the NFT 330 has been generated, the NFT 300 is communicated to the distributed trust computing network 100. In response to the distributed trust computing network 100 receiving the NFT 330, the decentralized nodes 110 of the trust computing network 100 are configured to reach a consensus on the NFT 330 to verify the authenticity and certifiable state of the hardware component and generate a first data block 130 within the distributed ledger 120 that stores the verified NFT 330.

As will be discussed further in relation to FIG. 4, in accordance with further embodiments of the invention, the system 200 and, more specifically, the first instructions 320 of hardware authenticity and traceability sub-system 310 are configured to generate additional NFTs for sub-assemblies and/or end devices (i.e., herein, referred to as hardware devices) that comprise the components. Similar to the hardware component NFTs, the sub-assembly NFTs and hardware device NFTs are generated using at least one sub-assembly or hardware device identifier and the measured authenticity characteristics of the sub-assembly or hardware device as the input to a hash algorithm. The NFTs associated with a hardware device (i.e., the various component NFTs, sub-assembly NFTs and hardware device NFT) are subsequently containerized in a principal NFT which links all of the associated NFTs to the hardware device. Thus, the principal NFT provides an end-user of the hardware device access to the associated NFTs for purposes of verifying authenticity of the hardware device and its components and sub-assemblies, as well as, chain-of-custody and rightful possession (e.g., ownership) of the hardware device.

Figure 3:
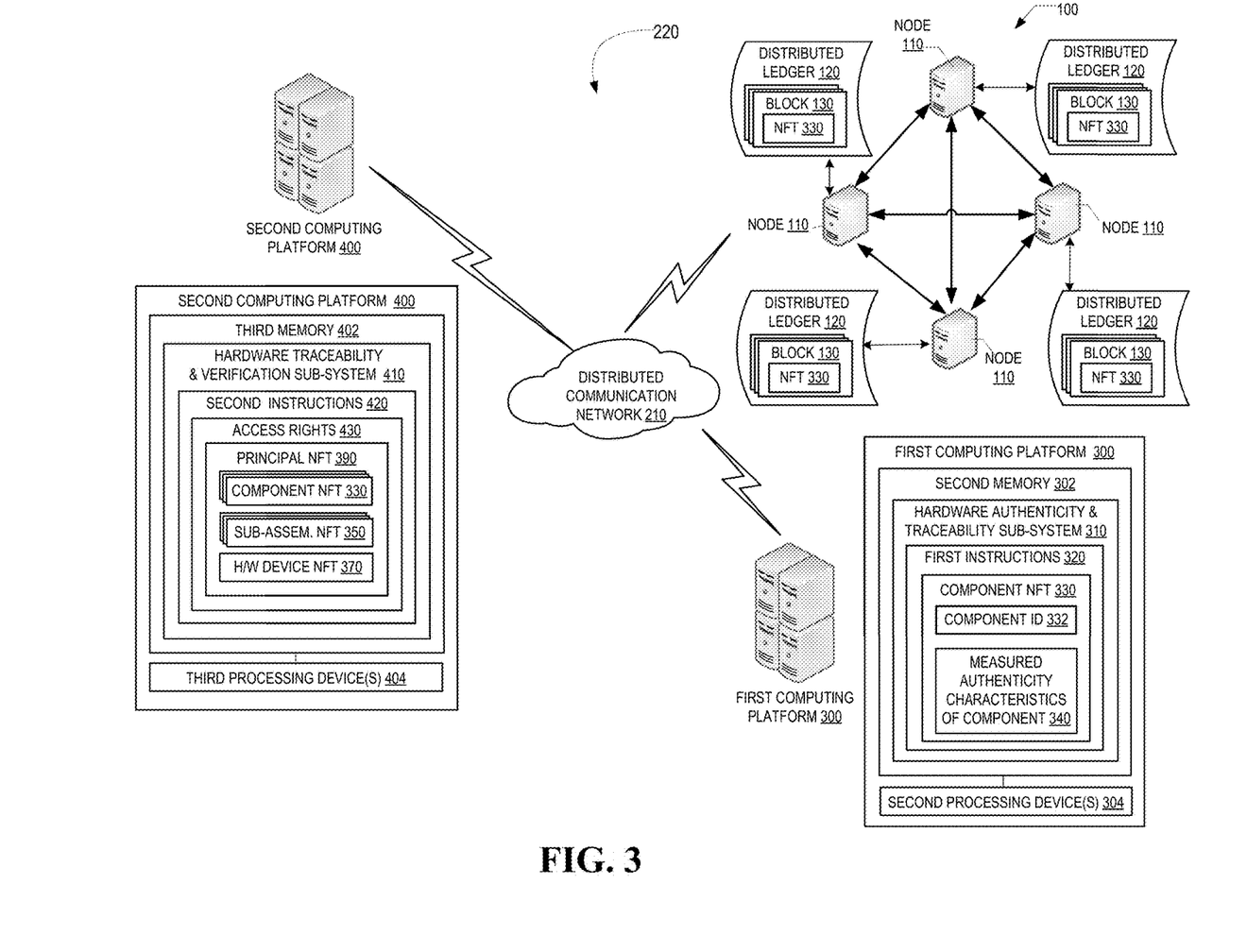
FIG. 3 is a schematic/block diagram of a hardware authenticity and traceability system, in accordance with embodiments of the present invention.

Referring to FIG. 3, a schematic/block diagram is presented of an alternate system 220 for end user hardware device traceability and verification, in accordance with embodiments of the present invention. The system 220 includes both the distributed trust computing network 100 and first computing platform 300 discussed in relation to FIG. 2. The system additionally includes a second computing platform 400 that is in network communication with the distributed trust computing network 100 via distributed communication network 210. Second computing platform 400 includes third memory 402 and at least one third processing device 304 in communication with third memory 402. Third memory 402 stores end user hardware traceability and verification sub-system 410 that includes second instructions 420, which are executable by at least one of the third processing devices 304. Second instructions 420 are configured to, in response to the end user receiving the hardware device, grant access rights 430 to the principal hardware device NFT 390, which as previously discussed links the component NFTs 330, any sub-assembly NFTs 350 (e.g., circuit boards or the like) and the hardware device NFT 370 so that the end user may access at least one of the principal NFT 390, the hardware device NFT 370, sub-assembly NFT(s) 350 and component NFTs 330 stored on the distributed ledger 120 of the distributed trust network 100 to verify traceability (i.e., chain-of-custody) and authenticity of the hardware device and its components and sub-assemblies and prove rightfully possession (e.g., ownership) of the hardware device and its components and sub-assemblies.

It should be noted that in alternate embodiments of the system 220, the hardware traceability and verification sub-system may be implemented by sub-assemblers. In such, embodiments of the invention, second instructions 420 are configured to grant access rights 430 to sub-assemblers so that sub-assemblers may access the component NFTs 330 stored on the distributed ledger 120 of the distributed trust network 100 to verify traceability (i.e., chain-of-custody) and authenticity of the hardware components prior to assembling the sub-assembly.

Figure 4:
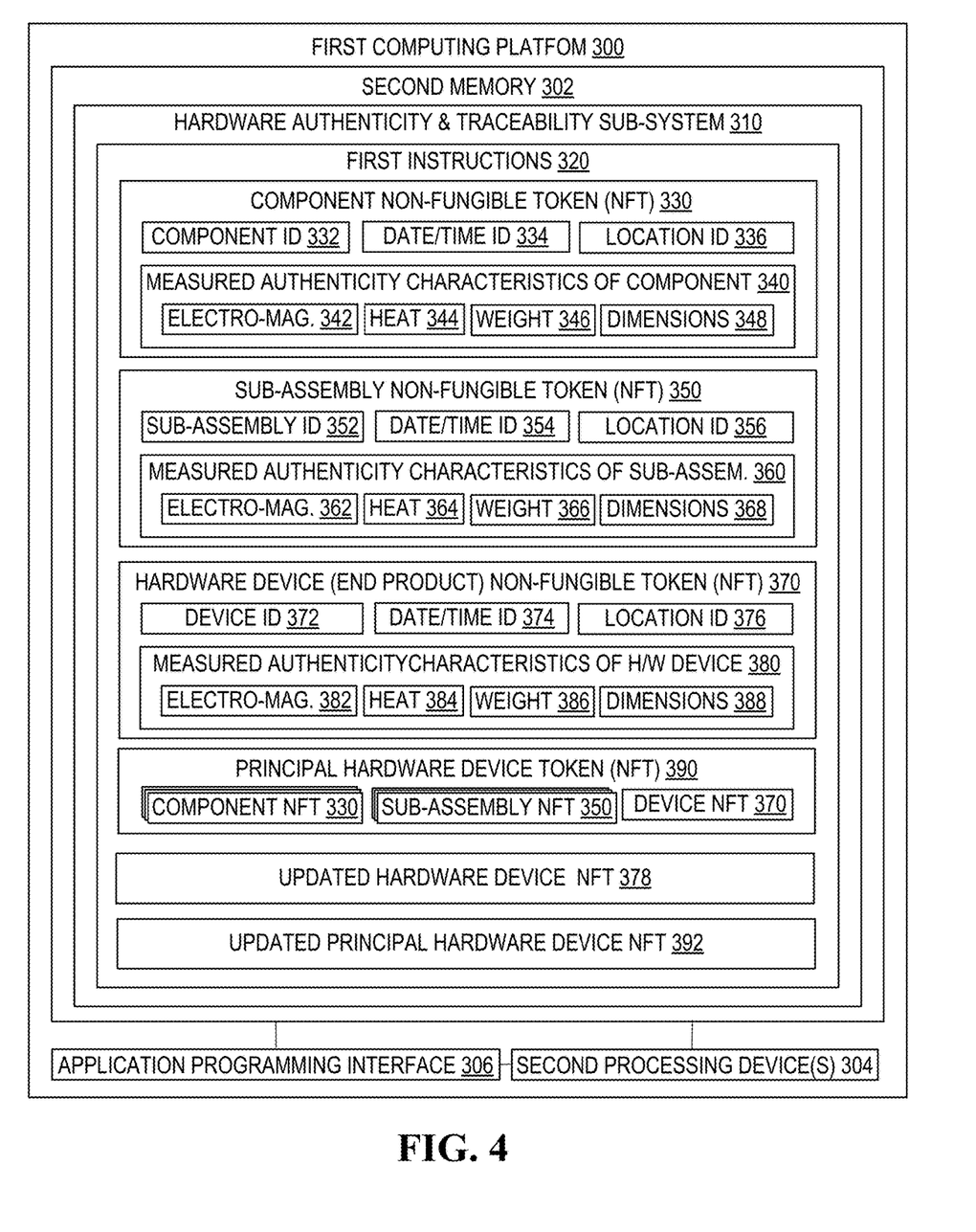
FIG. 4 is a block diagram of a computing platform including a hardware authenticity and traceability sub-system, in accordance with embodiments of the present invention.

Referring to FIG. 4, a block diagram is presented of first computing platform 300 including hardware authenticity and traceability sub-system 310, in accordance with embodiments of the present invention. First computing platform 300 comprises one or more computing devices/apparatus, such as application servers or the like configured to execute software programs, including instructions, engines, algorithms, modules, routines, applications, tools, and the like. First computing platform 300 includes second memory 302, which may comprise volatile and non-volatile memory, EPROM, EEPROM, flash cards, or any memory common to computer platforms. Moreover, second memory 302 may comprise cloud storage, such as provided by a cloud storage service and/or a cloud connection service.

Further, first computing platform 300 also includes second processing device(s) 304, which may be an application-specific integrated circuit ("ASIC"), or other chipset, logic circuit, or other data processing device. Second processing device 304 may execute an application programming interface ("API") 306 that interfaces with any resident programs, such as hardware authenticity and traceability sub-system 310 and algorithms, sub-engines/routines associated therewith or the like stored in the second memory 302 of first computing platform 300.

Second processing device(s) 304 may include various processing subsystems (not shown in FIG. 4) embodied in hardware, firmware, software, and combinations thereof, that enable the functionality of first computing platform 300 and the operability of computing platform 300 on a distributed communication network 210. For example, processing subsystems allow for initiating and maintaining communications and exchanging data with other networked devices. For the disclosed aspects, processing subsystems of second processing device(s) 304 may include any subsystem used in conjunction with hardware authenticity and traceability sub-system 310 and related engines, routines, algorithms, sub-algorithms, modules, sub-modules thereof.

First computing platform 300 additionally includes a communications module (not shown in FIG. 4) embodied in hardware, firmware, software, and combinations thereof, that enables electronic communications between first computing platform 300 and other networks and/or networked devices, such as, distributed trust computing network 100 and the like. Thus, the communication module may include the requisite hardware, firmware, software and/or combinations thereof for establishing and maintaining a network communication connection with one or more systems, platforms, networks, or the like.

Second memory 302 of first computing platform 300 stores hardware authenticity and traceability sub-system 310 that includes first instructions 320 which are configured to, in response to manufacturing hardware components and measuring authenticity characteristics of the hardware components, generate component-based non-fungible tokens (NFT) 330 for a plurality of components that comprise a hardware device. One of ordinary skill in the art will appreciate, that while the greater number of component-based NFTs for a given hardware device is preferred to ensure overall traceability and device integrity, it is not required that each component of the hardware device have a corresponding component-based NFT. As previously discussed, the component-based NFT 330 is generated using at least one component identifier 332 (e.g., serial number or the like) and the measured authenticity characteristics 340 of the component as the input to the hash algorithm. In alternate embodiments of system, other information may be included in the NFT and/or used as inputs to the hash algorithm, including date/time identifier 334 and location identifier 336, which indicate the date/time and location of the manufacture of the component. Additionally, as previously discussed, the measured authenticity characteristics 340 include any characteristic of the hardware component that is measurable and is associated with component integrity (i.e., ensuring that the component is in a certifiable-state and has not otherwise been tampered with). In specific embodiments of the invention, the measured authenticity characteristics may include, but are not limited to, electro-magnetic characteristics 342, heat attributes/characteristics 344, physical characteristics, such weight 346, dimensions 348 and the like.

In addition, first instructions 320 are configured to, in response to receiving components, assembling a sub-assembly and measuring authenticity characteristics of the sub-assembly, generate a sub-assembly-based non-fungible tokens (NFT) 350. Examples of a sub-assembly may include a central processing unit (with the integrated circuit/chip as a component), a circuit board or the like. The sub-assembly-based NFT 350 is generated using at least one sub-assembly identifier 352 (e.g., serial number or the like) and the measured authenticity characteristics 360 of the sub-assembly as the input to the hash algorithm. In alternate embodiments of the system, other information may be included in the sub-assembly-based NFT 350 and/or used as inputs to the hash algorithm, including date/time identifier 354 and location identifier 356, which indicate the date/time and location of the manufacture of the sub-assembly. Additionally, as previously discussed, the measured authenticity characteristics 360 of the sub-assembly may include any characteristic of the sub-assembly that is measurable and is associated with sub-assembly integrity (i.e., ensuring that the sub-assembly is in a certifiable-state and has not otherwise been tampered with). In specific embodiments of the invention, the measured authenticity characteristics of the sub-assembly may include, but are not limited to, electro-magnetic characteristics 362, heat attributes/characteristics 364, physical characteristics, such weight 366, dimensions 368 and the like.

Additionally, first instructions 320 are configured to, in response to receiving components and/or sub-assemblies, manufacturing the hardware device and measuring authenticity characteristics of the hardware device (i.e., end-user product), generate a hardware device-based non-fungible token (NFT) 370. The hardware device-based NFT 350 is generated using at least one hardware device identifier 372 (e.g., serial number or the like) and the measured authenticity characteristics 380 of the hardware device as the input to the hash algorithm. In alternate embodiments of the system, other information may be included in the hardware device-based NFT 370 and/or used as inputs to the hash algorithm, including date/time identifier 374 and location identifier 376, which indicate the date/time and location of the manufacture of the hardware device. Additionally, as previously discussed, the measured authenticity characteristics 380 of the hardware device may include any characteristic of the hardware device that is measurable and is associated with hardware device integrity (i.e., ensuring that the hardware device is in a certifiable-state and has not otherwise been tampered with). In specific embodiments of the invention, the measured authenticity characteristics of the hardware may include, but are not limited to, electro-magnetic characteristics 382, heat attributes/characteristics 384, physical characteristics, such weight 386, dimensions 388 and the like.

Moreover, first instructions 320 are configured to, in response to manufacturing the hardware device and generating the hardware device NFT 370, generate a principal hardware device NFT 390 that uses at least one hardware device identifier 372 as the input to a hash algorithm and links the hardware device NFT 370 to the component NFTs 330 and any sub-assembly NFTs 350. In this regard, as previously discussed, the end-user is presented with the principal hardware NFT 390 to gain access to any and all of the hardware device NFT 370, the component NFTs 330 and any sub-assembly NFTs 350 for purposes of accessing the distributed ledger 120 (shown in FIG. 2) to verify traceability (i.e., chain-of-custody), integrity down to the component level and rightful possession (e.g., ownership or the like).

Additionally, first instructions 320 are configured to, in response to adding, or changing out a component or sub-assembly in the hardware and re-measuring the authenticity characteristics of the hardware device, generate an updated hardware device-based NFT 378 and/or an updated principal hardware device NFT 392. The updated hardware device NFT 378 is generated using the hardware device identifier 372 and the re-measured authenticity characteristics as the inputs to the hash algorithm. The updated principal hardware device NFT 392 is generated using at least the hardware device identifier 372 and links the updated hardware device NFT, the component NFTs including any updated/new component NFTs and, where applicable the sub-assembly NFTs including any updated/new sub-assemblies.

Once the NFTs 330, 350 and/or 370 or the updated NFTs 378 and/or 392 have been generated, the NFTs 330, 350, 370 and updated NFTs 378, 392 are communicated to the distributed trust computing network 100. In response to the distributed trust computing network 100 receiving the NFTs 330, 350, 370 and updated NFTs 378, 392, the decentralized nodes 110 of the trust computing network 100 are configured to reach a consensus on the NFTs 330, 350, 370 and updated NFTs 378, 392 to verify the authenticity and certifiable state of the hardware component, sub-assembly, hardware device and/or updated hardware device and generate a first data block 130 within the distributed ledger 120 that stores the verified NFT NFTs 330, 350, 370 and updated NFTs 378, 392.

Figure 5:
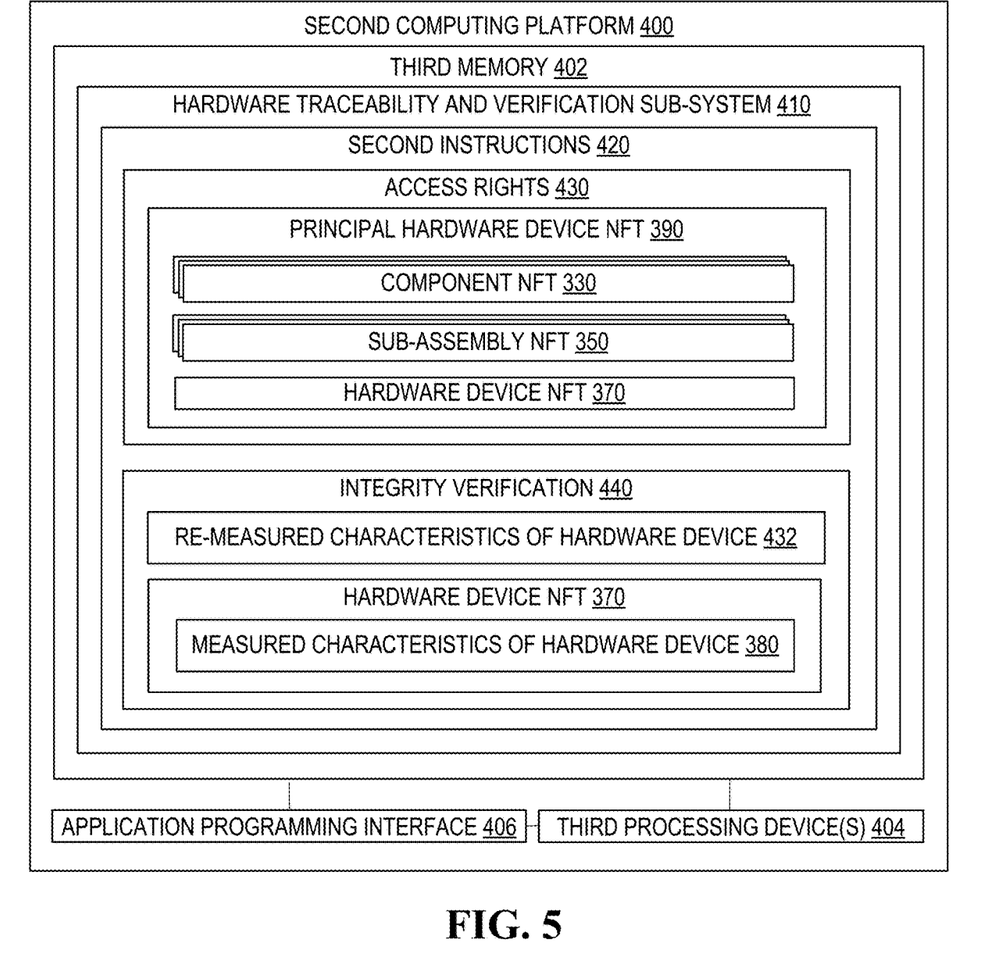
FIG. 5 is a block diagram of a computing platform including an end-user hardware device traceability and verification sub-system, in accordance with alternate embodiments of the invention.

Referring to FIG. 5, a block diagram is presented of second computing platform 400 including hardware traceability and verification sub-system 410, in accordance with embodiments of the present invention. Second computing platform 400 comprises one or more computing devices/apparatus, such as application servers or the like configured to execute software programs, including instructions, engines, algorithms, modules, routines, applications, tools, and the like. Second computing platform 400 includes third memory 402, which may comprise volatile and non-volatile memory, EPROM, EEPROM, flash cards, or any memory common to computer platforms. Moreover, third memory 402 may comprise cloud storage, such as provided by a cloud storage service and/or a cloud connection service.

Further, second computing platform 400 also includes third processing device(s) 404, which may be an application-specific integrated circuit ("ASIC"), or other chipset, logic circuit, or other data processing device. Third processing device 404 may execute an application programming interface ("API") 406 that interfaces with any resident programs, such as hardware traceability and verification sub-system 410, and algorithms, sub-engines/routines associated therewith or the like stored in the third memory 402 of second computing platform 400.

Third processing device(s) 404 may include various processing subsystems (not shown in FIG. 5) embodied in hardware, firmware, software, and combinations thereof, that enable the functionality of second computing platform 400 and the operability of second computing platform 400 on a distributed communication network 210. For example, processing subsystems allow for initiating and maintaining communications and exchanging data with other networked devices. For the disclosed aspects, processing subsystems of third processing device(s) 404 may include any subsystem used in conjunction with hardware traceability and verification sub-system 410, and related engines, routines, algorithms, sub-algorithms, modules, sub-modules thereof.

Second computing platform 400 additionally includes a communications module (not shown in FIG. 5) embodied in hardware, firmware, software, and combinations thereof, that enables electronic communications between second computing platform 400 and other networks and/or networked devices, such as, distributed trust computing network 100 and the like. Thus, the communication module may include the requisite hardware, firmware, software and/or combinations thereof for establishing and maintaining a network communication connection with one or more systems, platforms, networks, or the like.

Third memory 402 of second computing platform 400 stores hardware traceability and verification sub-system 410 that includes second instructions 420 which are configured to, in conjunction with an end-user receiving the hardware device, grant access rights 420 to the principal hardware device NFT 390. As previously discussed the principal hardware device NFT 390 links the hardware device NFT 370 to the component NFTs 330 and any sub-assembly NFTs 350, such that, a user accessing the principal hardware device NFT 390 has access to the hardware device NFT 370, the component NFTs 330 and any sub-assembly NFTs for purposes of verifying traceability (i.e., chain-of-custody), integrity and rightful possession (e.g., ownership, lease or the like) of the hardware device, the components and any sub-assembly.

In alternate embodiments of the invention, the second instructions 420 of the hardware traceability and verification sub-system 410 are configured to, in response to assembler receiving the components, grant the assembler access rights 420 to the component NFTs or composite/principal NFT linking all of the component NFTs associated with the sub-assembly for purposes verifying traceability, integrity and rightful possession of the components.

Additionally, second instructions 420 of the hardware traceability and verification sub-system 410 is configured to perform integrity verification 430 to verify that the hardware device and/or the components and/or sub-assemblies are in a known good state (i.e., have not been tampered with). In this regard, the end-user may perform tests/measurements resulting in re-measured authenticity characteristics 432 of the hardware device. Such re-measurements may occur upon receipt of the hardware device (i.e., to verify that the hardware device has not altered or otherwise tampered with in route) or periodically during use (i.e., to verify that the hardware device has not been altered or otherwise tampered with during the use period). Once the re-measurement of the authenticity characteristics 432 have been performed, the access rights 420 are employed to access the hardware device NFT 370 and compare the re-measured authenticity characteristics 432 to the initial measured authenticity characteristics of the hardware device 380 which formed at least a portion of the input to the hash algorithm when generating the hardware device NFT 370. If the comparison results in differences between the re-measured authenticity characteristics 432 and the initial measured authenticity characteristics of the hardware device 380, the hardware device is deemed to have been altered/tampered with and further suspicious activity investigation may need to be performed.

In alternate embodiments of the invention, integrity verification 430 may be performed at any stage during the manufacturing and/or assembly of the hardware device. For example, an assembler may perform integrity verification upon receipt of hardware components (i.e., re-measure authenticity characteristics of the components) and access the component NFTs stored on the distributed ledger to compare the re-measured authenticity characteristics of the components to the initial measured authenticity characteristics of the components as defined in the component NFT.

Figure 6:
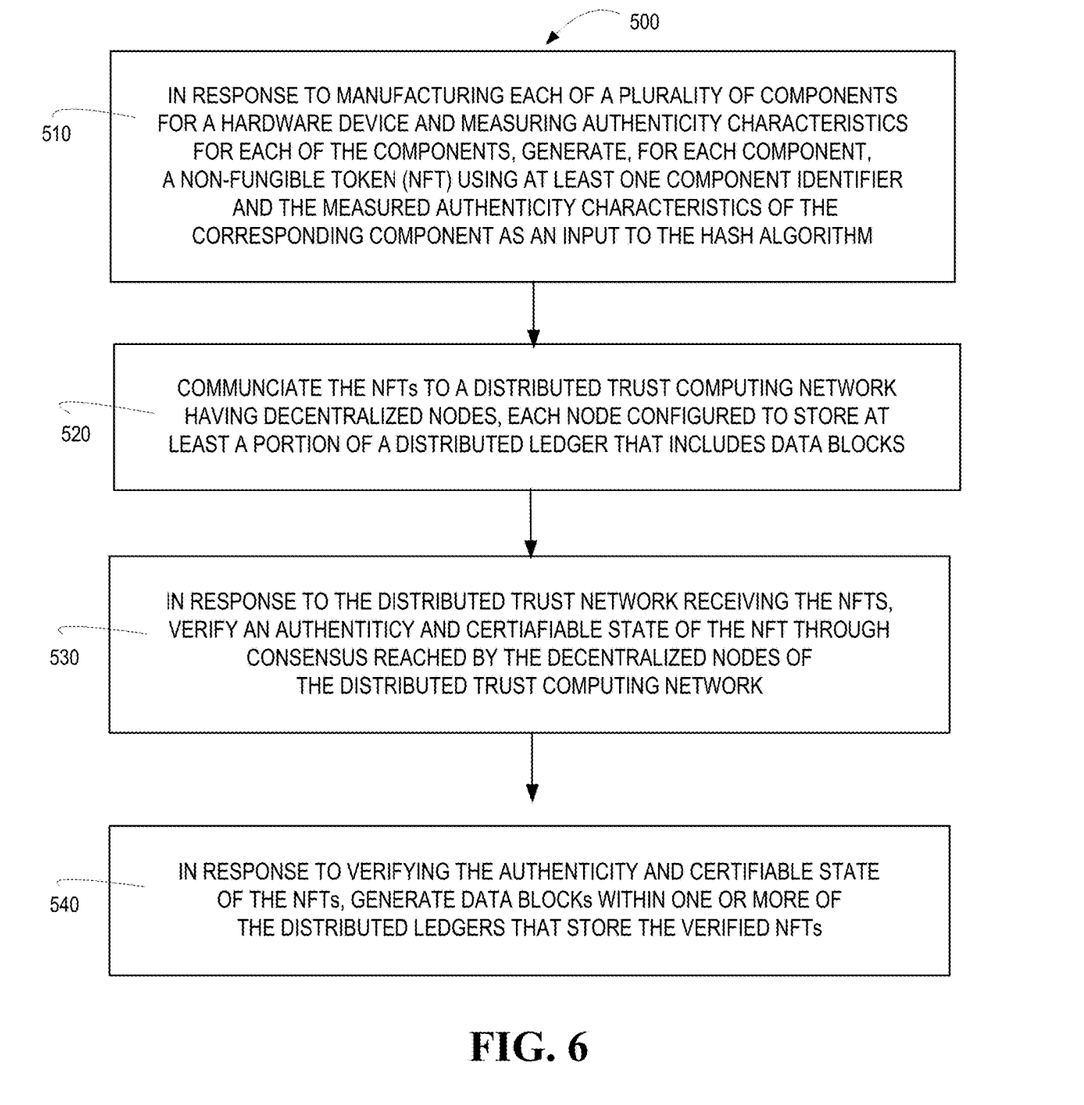
FIG. 6 is a flow diagram of a method for hardware authenticity and traceability, in accordance with embodiments of the present invention.

Referring to FIG. 7, a flow diagram is depicted of a computer-implemented method 500 for verifying authenticity of hardware and initiating traceability of hardware, in accordance with embodiments of the present invention. At Event 510, in response to manufacturing each of a plurality of components for a hardware device and measuring authenticity characteristics for each of the plurality of components, a component-based NFT is generated that uses, as the input to the hash algorithm, at least one component identifier and the measured authenticity characteristics of the corresponding component. As previously discussed, the authenticity characteristics include any characteristic of the hardware component that is measurable and is associated with component integrity (i.e., ensuring that the component is in a certifiable-state and has not otherwise been altered/tampered). In specific embodiments of the invention, the measurements may include, but are not limited to, electromagnetic characteristics, heat attributes/characteristics, physical characteristics, such weight, dimensions and the like. To ensure the integrity of the component the authenticity characteristics should be measured as soon as possible after the component has manufactured and conducted in a controlled environment.

In response to generating the component-based NFTs, at Event 520, the component-based NFTs are communicated to a distributed trust computing network. The distributed trust computing network comprises a plurality of decentralized having a memory and one or more processing devices in communication with the memory. The memory of the decentralized nodes stores one or more distributed ledgers, which comprise a plurality of data blocks.

In response to the distributed trust network receiving the component-based NFTs, at Event 530, the authenticity and certifiable state of the NFTs, and, thus, the component is verified by the decentralized nodes of the distributed trust computing network reaching a consensus on the NFT. In response to verifying the authenticity and certifiable state of the NFTs, at Event 540, data blocks are generated within the distributed ledger of the distributed trust computing network that store a corresponding one of the verified NFTs. In this regard, the distributed ledger provides hardware integrity verification and traceability (i.e., chain-of-custody) when the components are subsequently assembled into sub-assemblies or end products (i.e., hardware devices). As previously discussed, the computer-implemented method may further include events for generating NFTs for subsequent sub-assemblies and/or the hardware device that includes the components. In such embodiments of the method, the generation of NFTs may use, as inputs to the hash algorithm(s), at least one identifier of the sub-assembly or hardware device and measured authenticity characteristics of the sub-assemblies and/or hardware device/end product.

Thus, as described in detail above, present embodiments of the invention include systems, methods, computer program products and/or the like for a comprehensive system for chain-of-custody for hardware devices and their components. Specifically, according to embodiments of the invention, as the components, assemblies and the hardware device are manufactured, non-fungible tokens (NFTs) are generated for each component, assembly and the overall hardware device that indicate that the component, assembly or hardware device is in a certified/verified good state (i.e., the component, assembly and hardware device are in the state they should be and have not been otherwise tampered with). The NFTs are generated using measured authenticity characteristics (e.g., electro-magnetic, heat, weight, dimensions and the like) of a corresponding component, assembly or hardware device as at least a portion of the input to the hash algorithm. The NFTs are subsequently communicated to a distributed trust computing network at which the nodes converge to verify an authenticity and certifiable state of the NFT, and data blocks are generated within distributed ledgers that store the verified NFT.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for hardware authenticity and traceability, the system comprising;
   a distributed trust computing network comprising a plurality of decentralized nodes, each decentralized node having a first memory and at least one first processing device in communication with the first memory, wherein the first memory of the decentralized nodes is configured to store one or more distributed ledgers, each distributed ledger comprising a plurality of blocks of data; and
   a first computing platform including a second memory and at least one second processing device in communication with the second memory, wherein the second memory stores a hardware authenticity and traceability sub-system that includes first instructions that are executable by the at least one second processing device and are configured to:
   in response to manufacturing each of a plurality of components for a hardware device and measuring authenticity characteristics for each of the plurality of components, generate, for each of the plurality of components, a component-based non-fungible token (NFT) associated with a corresponding component using at least one component identifier and the measured authenticity characteristics of the corresponding component as an input to a hash algorithm,
   in response to manufacturing the hardware device including the plurality of components and measuring authenticity characteristics of the hardware device, generate (i) a hardware device-based NFT associated with the hardware device using at least one hardware device identifier and the measured authenticity characteristics of the hardware device as an input to a hash algorithm, and (ii) a principal hardware device NFT using at least one hardware device identifier as an input to the first hash algorithm or another hash algorithm, wherein the principal hardware device NFT links the hardware device-based NFT to each of the component-based NFTs,
   in response to updating, during use, the hardware device by adding or deleting a component to the hardware device and re-measuring authenticity characteristics of the hardware device, generate an updated hardware device-based NFT associated with the hardware device using at least one hardware device identifier and the re-measured authenticity characteristics of the hardware device as an input to a hash algorithm, and
   communicate the (i) component-based NFTs, (ii) the hardware device-based NFT, (iii) the principal hardware device NFT and (iv) the updated hardware device-based NFT to the distributed trust computing network;
   wherein in response to the distributed trust computing network receiving (i) the component-based NFTs, (ii) the hardware device-based NFT, (iii) the principal hardware device NFT and (iv) the updated hardware device-based NFT, the decentralized nodes of the distributed trust computing network are configured to (a) reach a consensus on each of the component-based NFTs, the hardware device-based NFT, the principal hardware device NFT and the updated hardware device-based NFT to verify an authenticity and certifiable state of the corresponding component, the hardware device, the link and the updated hardware device and (b) generate blocks of data within at least one of the one or more distributed ledgers, each of the blocks of data storing (i) one of the verified component-based NFTs, (ii) the verified hardware device-based NFT, (iii) the verified principal hardware device NFT or (iv) the verified updated hardware device-based NFT.

2. The system of claim 1, wherein the first instructions are further configured to:

generate an updated principal hardware device NFT using at least one hardware device identifier and the least one component identifier for each of the plurality of components as an input to the hash algorithm and link the updated hardware device-based NFT to each of the component-based NFTs, and communicate the updated principal hardware device NFT to the distributed trust computing network, wherein in response to the distributed trust computing network receiving the updated principal hardware device NFT, the decentralized nodes of the distributed trust computing network are configured to (i) reach a consensus on the updated principal hardware device to verify an authenticity and certifiable state of the updated hardware device and the plurality of components, and (ii) generate a block of data within at least one of the one or more distributed ledgers that stores the verified updated principal hardware device NFT.

3. The system of claim 1, wherein the first instructions configured to generate, for each of the plurality of components, the component-based NFT associated with a corresponding component are further configured to generate the component-based NFTs further using (i) a date and a time of manufacturing the corresponding component and (ii) a physical manufacturing location as the inputs to the hash algorithm.

4. The system of claim 1, further comprising a second computing platform including a third memory and at least one third processing device in communication with the third memory, wherein the third memory stores an end-user hardware traceability and verification sub-system that includes second instructions that are executable by the at least one third processing device and are configured to:

in conjunction with receiving the hardware device, receive access rights to the principal hardware device NFT, and access at least one of the principal hardware device NFT, the hardware device-based NFT and one or more of the component-based NFTs stored on one or distributed ledgers of the distributed trust computing network to verify traceability and authenticity of at least one of the hardware device and one or more of the plurality of components of the hardware device.

5. The system of claim 4, wherein the second instructions are further configured to:

in response to periodically re-measuring one or more of the authenticity characteristics of the hardware device, access at least one of the principal hardware device NFT, and the hardware device-based NFT stored on one or distributed ledgers of the distributed trust computing network to verify authenticity of the hardware device by comparing the measured authenticity characteristic used as inputs for generating the hardware-based NFT to the re-measured authenticity characteristics of the hardware device.

6. The system of claim 1, wherein the measured authenticity characteristics of the component include one or more of (i) electro-magnetic characteristics, (ii) heat characteristics (iii) weight of the component, and (iv) physical dimensions of the component.

7. A computer-implemented method for software authenticity and traceability, the computer-implemented method is executed by one or more processing devices and comprising;

in response to manufacturing each of a plurality of components for a hardware device and measuring authenticity characteristics for each of the plurality of components, generating, for each of the plurality of components, a component-based non-fungible token (NFT) associated with a corresponding component using at least one component identifier and the measured authenticity characteristics of the corresponding component as an input to a hash algorithm;

in response to manufacturing the hardware device including the plurality of components and measuring authenticity characteristics of the hardware device, generating (i) a hardware device-based NFT associated with the hardware device using at least one hardware device identifier and the measured authenticity characteristics of the hardware device as an input to a hash algorithm and (ii) a principal hardware device NFT using at least one hardware device identifier as an input to the first hash algorithm or another hash algorithm, wherein the principal hardware device NFT links the hardware device-based NFT to each of the component-based NFTs;

in response to updating, during use, the hardware device by adding or deleting a component to the hardware device and re-measuring authenticity characteristics of the hardware device, generating an updated hardware device-based NFT associated with the hardware device using at least one hardware device identifier and the re-measured authenticity characteristics of the hardware device as an input to a hash algorithm;

communicating (i) the component-based NFTs, (ii) the hardware device-based NFT, (iii) the principal hardware device NFT and (iv) the updated hardware device-based NFT to a distributed trust computing network comprising a plurality of decentralized nodes, each decentralized node having a first memory and at least one first processor in communication with the memory, wherein the first memory of the decentralized nodes is configured to store a distributed ledger comprising a plurality of blocks of data;

in response to the distributed trust computing network receiving (i) the component-based NFTs, (ii) the hardware device-based NFT, (iii) the principal hardware device NFT and (iv) the updated hardware device-based NFT, verifying an authenticity and certifiable state of the each component, the hardware device, the link and the updated hardware device through consensus reached by the decentralized nodes of the distributed trust computing network on each of the component-based NFTs, the hardware device-based NFT, the principal hardware device NFT and the updated hardware device-based NFT; and in response to verifying the authenticity and certifiable state of each component, the hardware device, the link and the updated hardware device, generating blocks of data within at least one of the one or more distributed ledgers, each of the blocks of data storing (i) one of the verified component-based NFTs, (ii) the verified hardware device-based NFT, (iii) the verified principal hardware device NFT or (iv) the verified updated hardware device-based NFT.

8. The computer-implemented method of claim 7, wherein generating, for each of the plurality of components, the component-based NFT associated with a corresponding component further comprises generating the component-based NFTs further using (i) a date and time of manufacturing the corresponding component and (ii) a physical manufacturing location as the inputs to the hash algorithm.

9. The computer-implemented method of claim 7, further comprising:

in conjunction with receiving the hardware device, receiving access rights to the principal hardware device NFT; and accessing at least one of the principal hardware device NFT, the hardware device-based NFT and one or more of the component-based NFTs stored on one or distributed ledgers of the distributed trust computing network to verify traceability and authenticity of at least one of the hardware device and one or more of the plurality of components of the hardware device.

10. A computer program product including a non-transitory computer-readable medium, the non-transitory computer-readable medium comprising:

a first set of codes for causing a computer to, in response to manufacturing each of a plurality of components for a hardware device and measuring authenticity characteristics for each of the plurality of components, generate, for each of the plurality of components, a component-based non-fungible token (NFT) associated with a corresponding component using at least one component identifier and the measured authenticity characteristics of the corresponding component as an input to a hash algorithm;

a second set of codes for causing a computer to, in response to manufacturing the hardware device including the plurality of components and measuring authenticity characteristics of the hardware device, generate (i) a hardware device-based NFT associated with the hardware device using at least one hardware device identifier and the measured authenticity characteristics of the hardware device as an input to a hash algorithm, and (ii) a principal hardware device NFT using at least one hardware device identifier as an input to the first hash algorithm or another hash algorithm, wherein the principal hardware device NFT links the hardware device-based NFT to each of the component-based NFTs;

a third set of codes for causing a computer to, in response to updating, during use, the hardware device by adding or deleting a component to the hardware device and re-measuring authenticity characteristics of the hardware device, generating an updated hardware device-based NFT associated with the hardware device using at least one hardware device identifier and the re-measured authenticity characteristics of the hardware device as an input to a hash algorithm;

a fourth set of codes for causing a computer to communicate (i) the component-based NFTs, (ii) the hardware device-based NFT, (iii) the principal hardware device NFT and (iv) the updated hardware device-based NFT to a distributed trust computing network comprising a plurality of decentralized nodes, each decentralized node having a first memory and at least one first processor in communication with the memory, wherein the first memory of the decentralized nodes is configured to store a distributed ledger comprising a plurality of blocks of data;

a fifth set of codes for causing a computer to, in response to the distributed trust computing network (i) the component-based NFTs, (ii) the hardware device-based NFT, (iii) the principal hardware device NFT and (iv) the updated hardware device-based NFT, verify an authenticity and certifiable state of the each component, the hardware device, the link and the updated hardware device through consensus reached by the decentralized nodes of the distributed trust computing network on each of the component-based NFTs, the hardware device-based NFT, the principal hardware device NFT and the updated hardware device-based NFT; and a sixth set of codes for causing a computer to, in response to verifying the authenticity and certifiable state of each component, the hardware device, the link and the updated hardware device, generating blocks of data within at least one of the one or more distributed ledgers, each of the blocks of data storing (i) one of the verified component-based NFTs, (ii) the verified hardware device-based NFT, (iii) the verified principal hardware device NFT or (iv) the verified updated hardware device-based NFT.

11. The computer program product of claim 10, wherein the first set of codes are further configured to cause the computer to generate the component-based NFTs further using (i) a date and time of manufacturing the corresponding component and (ii) a physical manufacturing location as the inputs to the hash algorithm.

* * * * *